(12) United States Patent
Mosko et al.

(10) Patent No.: US 8,750,254 B2
(45) Date of Patent: Jun. 10, 2014

(54) DYNAMIC FRAME SCHEDULING BASED ON PERMUTATIONS OF SUB-CHANNEL IDENTIFIERS

(75) Inventors: Marc Mosko, Santa Cruz, CA (US); Ignacio Solis, Redwood City, CA (US); J. J. Garcia Luna Aceves, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1771 days.

(21) Appl. No.: 11/644,665

(22) Filed: Dec. 21, 2006

(65) Prior Publication Data

US 2008/0151926 A1 Jun. 26, 2008

(51) Int. Cl.
*H04B 7/216* (2006.01)

(52) U.S. Cl.
USPC .......................................... 370/335; 370/342

(58) Field of Classification Search
None
See application file for complete search history.

(56) References Cited

U.S. PATENT DOCUMENTS

| | | | |
|---|---|---|---|
| 6,788,702 B1 | 9/2004 | Garcia-Luna-Aceves | 370/458 |
| 6,928,061 B1 | 8/2005 | Garcia-Luna-Aceves | 370/329 |
| 7,046,639 B2 | 5/2006 | Garcia-Luna-Aceves | 370/314 |
| 7,184,413 B2 | 2/2007 | Beyer | 370/254 |
| 2002/0067736 A1* | 6/2002 | Garcia-Luna-Aceves et al. | 370/442 |
| 2003/0214920 A1* | 11/2003 | Cain et al. | 370/326 |
| 2005/0122982 A1* | 6/2005 | Li et al. | 370/395.41 |
| 2005/0152329 A1* | 7/2005 | Krishnan et al. | 370/345 |
| 2006/0002349 A1* | 1/2006 | Demirhan | 370/338 |
| 2007/0047569 A1* | 3/2007 | Das et al. | 370/443 |
| 2007/0081548 A1* | 4/2007 | Jiang | 370/442 |

OTHER PUBLICATIONS

Chakraborty, Goutam, Genetic Algorithm to Solve Optimum TDMA Transmission Schedule in Broadcast Packet Radio Networks, EEE Transactions on Communications, vol. 52, No. 5, May 2004, pp. 765-777.

Publication: Bao, L. (2004), *MALS: Multiple Access Scheduling Based on Latin Squares*, in 'MILCOM', pp. 315-321.

Publication: Bao, L. & Garcia-Luna-Aceves, J. J. (2001), *Channel Access Scheduling in Ad-Hoc Networks with Unidirectional Links*, in 'DIALM '01: Proceedings of the 5th International Workshop on Discrete Algorithms and Methods for Mobile Computing and Communications,' ACM Press, New York, NY, USA, pp. 9-18.

Publication: Bao, L. & Garcia-Luna-Aceves, J. J. (2001), *A New Approach to Channel Access Scheduling for Ad Hoc Networks*, in 'MobiCom '01: Proceedings of the 7th Annual International Conference on Mobile Computing and Networking,' ACM Press, New York, NY, USA, pp. 210-221.

Publication: Chlamtac, I. & Farag'o, A. (1994), *Making Transmission Schedules Immune to Topology Changes in Multi-Hop Packet Radio Networks*, IEEE/ACM Trans. Netw. 2(1), 23-29.

(Continued)

*Primary Examiner* — Ajit Patel
(74) *Attorney, Agent, or Firm* — Shun Yao; Park, Vaughan, Fleming & Dowler LLP

(57) ABSTRACT

A communication system includes devices configured to communicate with each other through a temporal sequence of frames. Each of these frames includes multiple sub-channels and network information. Note that a given device is configured to select a first set of sub-channels to be reserved by the given device based on a first election technique in which a first ranking of a first permutation of a first ordered set of sub-channel identifiers is calculated. Furthermore, the given device is configured to dynamically reserve the selected first set of sub-channels.

20 Claims, 7 Drawing Sheets

(56) References Cited

OTHER PUBLICATIONS

Publication: Chlamtac, I., Farag'o, A. & Zhang, H. (1997), *Time-spread Multiple-access (TSMA) Protocols for Multihop Mobile Radio Networks*, IEEE/ACM Transactions on Networks 5(6), 804-812.

Publication: Cidon, I. & Sidi, M. (1989), *Distributed Assignment Algorithms for Multihop Packet Radio Networks*, IEEE Trans. Comput. 38(10), 1353-1361.

Publication: Coupechoux, M., Baynat, B., Bonnet, C. & Kumar, V. (2005), *Croma: An Enhanced Slotted Mac Protocol for Manets*, Mob. Netw. Appl. 10(1-2), 183-197.

Publication: Ephremides, A. & Truong, T. (1990), *Scheduling Broadcasts in Multihop Radio Networks*, IEEE Transactions on Communications 38(4), 456-460.

Publication: Ju, J.-H. & Li, V. O. K. (1998), *An Optimal Topology-transparent Scheduling Method in Multihop Packet Radio Networks*, IEEE/ACM Trans. Netw. 6(3), 298-306.

Publication: Ju, J.-H. & Li, V. O. K. (1999), *TDMA Scheduling Design of Multihop Packet Radio Networks Based on Latin Squares*, IEEE Journal on Selected Areas in Communications 17(8), 1345-1352.

Publication: Kanzaki, A., Hara, T. & Nishio, S. (2005), *An Adaptive TDMA Slot Assignment Protocol in Ad Hoc Sensor Networks*, in 'SAC '05: Proceedings of the 2005 ACM Symposium on Applied Computing', ACM Press, New York, NY, USA, pp. 1160-1165.

Publication: Kanzaki, A., Uemukai, T., Hara, T. & Nishio, S. (2003), *Dynamic TDMA Slot Assignment for Ad Hoc Networks*, in 'Proc. International Conference on Advanced Information Networking and Applications (AINA)', pp. 330-339.

Publication: Kleinrock, L.; Scholl, M. (1980), *Packet Switching in Radio Channels: New Conflict-Free Multiple Access Schemes*, IEEE Transactions on Communications 28(7), 1015-1029.

Publication: MacKay, D. J. C. (2003), *Cycle Graphs and Random Permutations* http://www.inference.phy.cam.ac.uk/mackay/itila/cycles.pdf.

Publication: Rajendran, V., Obraczka, K. & Garcia-Luna-Aceves, J. J. (2003), *Energy Efficient Collision-Free Medium Access Control for Wireless Sensor Networks*, in 'SenSys '03: Proceedings of the 1st International Conference on Embedded Networked Sensor Systems', ACM Press, New York, NY, USA, pp. 181-192.

Publication: Ramanathan, S. & Lloyd, E. L. (1992), *Scheduling Algorithms for Multi-Hop Radio Networks*, in 'SIGCOMM '92: Conference proceedings on Communications architectures & protocols', ACM Press, New York, NY, USA, pp. 211-222.

Publication: Ramanathan, S. & Lloyd, E. L. (1993), *Scheduling Algorithms for Multihop Radio Networks*, IEEE/ACM Trans. Netw. 1(2), 166-177.

Publication: Sen, A. & Huson, M. L. (1997), *A New Model for Scheduling Packet Radio Networks*, Wirel. Netw. 3(1), 71-82.

Publication: Shepard, T. J. (1996), *A Channel Access Scheme for Large Dense Packet Radio Networks*, in 'SIGCOMM '96', ACM Press, New York, NY, USA, pp. 219-230.

Publication: Zhu, C. & Corson, M. S. (2001), *A Five-Phase Reservation Protocol (FPRP) for Mobile Ad Hoc Networks*, Wirel. Netw. 7(4), 371-384.

Publication: Tang, Z. & Garcia-Luna-Aceves, J.J., *A Protocol for Topology-Dependent Transmission Scheduling*, Proc. IEEE Wireless Communications and Networking Conference 1999 (WCNC 99), New Orleans, Louisiana, Sep. 21-24, 1999.

\* cited by examiner

| RANK | $P_A(A,K)$ | $P_B(A,K)$ |
|---|---|---|
| 1 | 3 | 2 |
| 2 | 2 | 1 |
| 3 | 4 | 4 |
| 4 | 1 | 3 |

| i | $\pi_t(i)$ | $\pi_c(i)$ |
|---|---|---|
| 1 | 2 | 3 |
| 2 | 1 | 1 |
| 3 | 3 | 5 |
| 4 | 5 | 2 |
| 5 | 4 | 4 |

600 ↘

| DEVICES (610) | GEOMETRIC (612) | N/N (614) | N/2N (616) | N/10N (618) |
|---|---|---|---|---|
| 20 | 19.5 | 16.5 | 17.3 | 19.6 |
| 100 | 99.5 | 79.0 | 83.6 | 96.0 |
| 250 | 249.5 | 196.7 | 208.6 | 238.8 |
| 500 | 499.5 | 391.0 | 414.7 | 477.5 |

| DEVICES (610) | GEOMETRIC (612) | N/N (614) | N/2N (616) | N/10N (618) |
|---|---|---|---|---|
| 20 | 19.5 | 16.3 | 16.4 | 16.5 |
| 100 | 99.5 | 78.7 | 79.0 | 79.0 |
| 250 | 249.5 | 196.0 | 196.4 | 196.0 |
| 500 | 499.5 | 391.7 | 391.4 | 392.3 |

| DEVICES (610) | GEOMETRIC (612) | N/N (614) | N/2N (616) | N/10N (618) |
|---|---|---|---|---|
| 20 | 90 | 61.2 | 63.2 | 69.2 |
| 100 | 458 | 301.3 | 313.1 | 344.7 |
| 250 | 1148 | 752.5 | 783.1 | 860.4 |
| 500 | 2300 | 1499.9 | 1560.7 | 1721.3 |

| DEVICES (610) | GEOMETRIC (612) | N/N (614) | N/2N (616) | N/10N (618) |
|---|---|---|---|---|
| 20 | 90 | 60.8 | 61.0 | 61.1 |
| 100 | 458 | 300.5 | 301.2 | 301.3 |
| 250 | 1148 | 750.8 | 751.7 | 751.0 |
| 500 | 2300 | 1501.6 | 1501.7 | 1503.2 |

FIG. 9

DYNAMIC FRAME SCHEDULING BASED ON PERMUTATIONS OF SUB-CHANNEL IDENTIFIERS

BACKGROUND

1. Field of the Invention

The present invention relates to techniques for accessing channels in networks. More specifically, the present invention relates to scheduling techniques for use with dynamic channel-access protocols.

2. Related Art

Recent advances in networking technology have made it possible to support multiple voice-related applications, such as mobile smart phones and Voice over Wireless Internet Protocol (VoWIP), on individual networks. In the near future, these applications may be running on mobile stations concurrently with legacy data-centric applications. To support such integrated voice/data traffic in a network, the channel-access protocol (such as the Medium-Access-Control protocol) in these systems needs to provide high channel utilization and bounded channel-access delay. The former is important for data-centric applications, and the latter is critical for providing uninterrupted data delivery in voice-related (i.e., real-time) applications.

Contention-based channel-access schemes have previously been developed for multiple-hop ad-hoc networks and for wireless local area networks or LANs. However, these existing approaches are unable to provide high channel utilization as network load increases. In addition, ad-hoc networks that utilize such conventional channel-access schemes are vulnerable to collisions, which can potentially starve certain stations by preventing them from acquiring the channel. As a consequence, the existing contention-based approaches are unable to ensure an upper bound on the channel-access delay. This makes it impossible to run soft real-time applications, and even bulk transfer applications, over these networks at high loads.

'Contention-free' schemes have been proposed to overcome these limitations, thereby providing conflict-free channel access independently of the radio connectivity around any given device or node in the communication system. These contention-free schemes may be classified as 'topology independent' and 'topology dependent.' In topology-independent channel-access schemes, deterministic transmission schedules are produced that allow nodes or devices in an ad-hoc network to periodically access the communication channel without collision and also ensure a bounded channel-access delay. For example, a device may be pre-assigned one or more unique sub-channels (such as time slots) in a global schedule. However, these contention-free schemes typically require an excessive amount of control-signaling overhead and global knowledge of the network, and typically also suffer from channel under-utilization.

In contrast, topology-dependent channel-access schemes use local topology information to produce the transmission schedules. These schemes may be used to construct schedules for small groups of devices, thereby solving the under-utilization problem at high loads while only using small-area topological knowledge. For example, dynamic (randomized) channel-access schemes use probabilistic transmission schedules in which each device always has a certain probability to access the channel during a given sub-channel.

Unfortunately, while such techniques incur less control overhead than the earlier contention-free channel-access protocols, they still do not ensure a bound on channel-access delay. In particular, as the number of devices competing for sub-channels increases in the communication system, the probability of any given device winning an election for a sub-channel goes down.

Hence, what is needed is a method and an apparatus that facilitates channel-access in networks without the problems listed above.

SUMMARY

One embodiment of this invention provides a communication system that includes devices configured to communicate with each other through a temporal sequence of frames. Each of these frames includes multiple sub-channels and network information. Note that a given device is configured to select a first set of sub-channels to be reserved by the given device based on a first election technique in which a first ranking of a first permutation of a first ordered set of sub-channel identifiers is calculated. Furthermore, the given device is configured to dynamically reserve the selected first set of sub-channels.

In some embodiments, the first permutation is performed on a frame-by-frame basis. For example, the first permutation for a current frame may be based on a pseudo-random number associated with a preceding frame. Furthermore, in some embodiments a pseudo-random-number generator generates the pseudo-random number. This pseudo-random-number generator may use a seed corresponding to an identifier for the preceding frame. In some embodiments, the seed is determined using a hash function.

In some embodiments, the sub-channels in the first set of sub-channels have an inter-sub-channel spacing that is less than a pre-determined value.

In some embodiments, the first set of sub-channels to be reserved is determined independently of times associated with the first set of sub-channels.

In some embodiments, if a tie occurs in which a group of devices are awarded equal priority for a given sub-channel under the election technique, the tie is resolved using a pseudo-random number. Furthermore, if the tie occurs, the tie may be resolved by awarding the given sub-channel to a first device in the group of devices that has been awarded the fewest sub-channels in a current frame using the election technique.

In some embodiments, the first ordered set of sub-channel identifiers corresponds to a first sub-set of the sub-channels in a current frame.

In some embodiments, another device in the devices is configured to determine a second set of sub-channels to reserve based on a second election technique in which a second ranking of a second permutation of a second ordered set of sub-channel identifiers is determined. Note that the second ordered set of sub-channel identifiers may correspond to a second sub-set of the sub-channels in the current frame.

In some embodiments, the number of devices which are contending for sub-channels using the election technique is larger than the number of sub-channels in each frame.

In some embodiments, each device contending for sub-channels using the election technique receives at least one sub-channel in a current frame.

In some embodiments, the sub-channels correspond to time slots, frequency bands, spread-spectrum codes, and/or directional antennas that transmit and receive the frames.

Another embodiment provides a communication device for use in the communication system.

Another embodiment provides a method including operations corresponding to the functions in the above-described communication system.

BRIEF DESCRIPTION OF THE FIGURES

FIG. 6 is a block diagram illustrating standard deviation in time-slot interval as a function of the number of devices in accordance with an embodiment of the present invention.

FIG. 7 is a block diagram illustrating standard deviation in time-slot interval as a function of the number of devices in accordance with an embodiment of the present invention.

FIG. 8 presents a block diagram illustrating $99^{th}$-percentile inter-time-slot time intervals in accordance with an embodiment of the present invention.

FIG. 9 presents a block diagram illustrating $99^{th}$-percentile inter-time-slot time intervals in accordance with a virtual-frame-size embodiment of the present invention.

Figure 1:
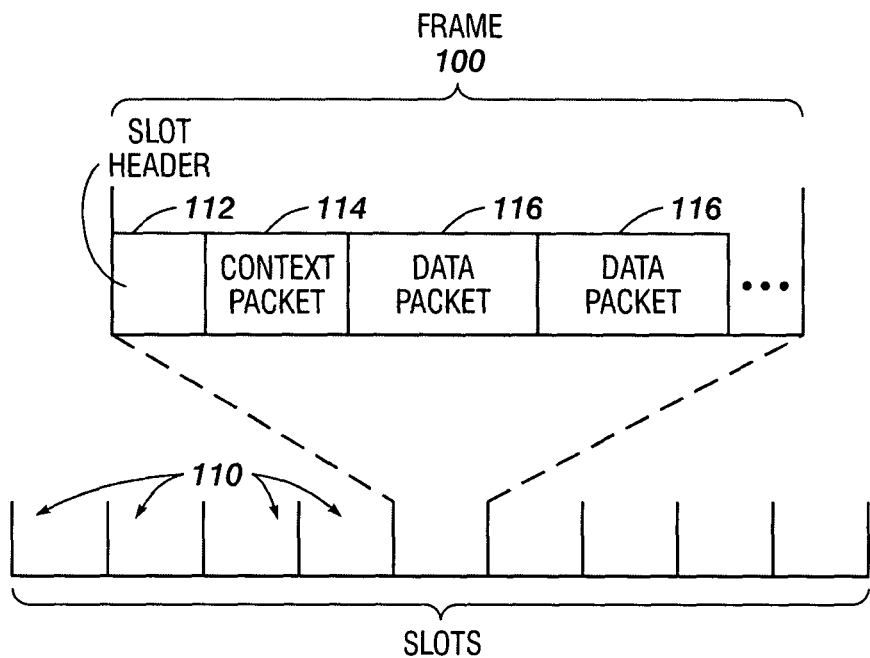
FIG. 1 is a block diagram illustrating a frame for use in a communication system in accordance with an embodiment of the present invention.

Table 1 provides exemplary pseudo-code for a random permutation technique in accordance with an embodiment of the present invention.

Table 2 provides exemplary pseudo-code for a dynamic scheduling technique in accordance with an embodiment of the present invention.

Table 3 provides exemplary pseudo-code for a Hamiltonian-cycle permutation technique in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a communication system, a method, and devices for use with the communication system are described. Communication between the devices in the communication system may be enabled by the method. In particular, nodes or devices (henceforth referred to as devices) in the communication system may communicate by exchanging a temporal sequence of frames, each of which includes multiple sub-channels. Furthermore, a dynamic scheduling technique in a channel-access protocol may be used to determine scheduling access (also referred to as elections) by different devices to a shared communication channel in the communication system.

During this technique contending devices for a sub-channel are determined, priorities are calculated for these devices, and the devices are assigned sub-channels based on their priorities. In particular, a pseudo-random permutation of an ordered set of sub-channel identifiers for each device is generated and compared to determine which device wins the right to transmit in which sub-channels. Note that each device wins at least one sub-channel per frame. Also note that the resulting schedules, when implemented as dynamic reservations on a frame-by-frame basis using the channel-access protocol, provide narrow distributions of inter-sub-channel spacing, and thus, bounded inter-sub-channel spacing and bounded channel-access delay in the communication system.

The method, devices, and/or communication system associated with the present invention may be utilized in a wide variety of network applications, including LANs (such as WiFi, WiMax, and/or a LAN that utilizes a communication protocol that is compatible with an IEEE 802 standard), wide area networks or WANs, metropolitan area networks or MANs, and/or cellular telephone networks (such as the Global System for Mobile communication or GSM). In addition, the method and/or communication system may include fixed and/or mobile stations, devices or nodes, and the network may utilize fixed cells, may include an extended access-point network, and/or may be a random or ad-hoc network. And in some embodiments, the method, devices, and/or communication system may involve or include communication protocols such as time division multiple access or TDMA, frequency division multiple access or FDMA, code division multiple access or CDMA, and/or a spatial diversity technique.

Note that in the discussion that follows the term 'election' refers to a technique for assigning sub-channels to multiple competing devices in the communication system, and the term 'reservation' refers to a technique in which a device that has won a sub-channel in an election communicates to other devices in the communication system that it intends to use the sub-channel for one, two, or more frames. Furthermore, a 'scheduling technique' may include an election technique and/or a reservation technique.

We now discuss embodiments of dynamic scheduling in a channel-access protocol, which may be characterized as contention-free. FIG. 1 presents a block diagram illustrating a frame 100 for use in a communication system in accordance with an embodiment of the present invention. This frame includes multiple sub-channels in the form of time slots 110 (which are used as an illustrative example). Each time slot may include a slot header 112 (including an identifier for the transmitter and the total amount of data), a context packet 114 (including information about the data flow), and/or one or more data packets 116 (which may be communicate to different or multiple devices).

Figure 2:
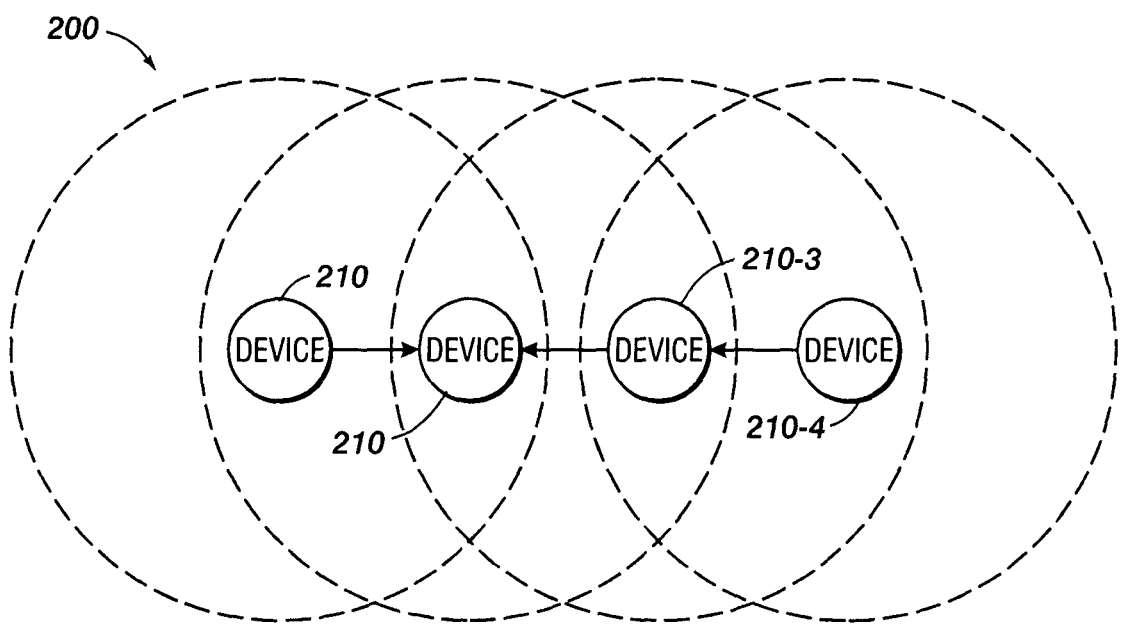
FIG. 2 is a block diagram illustrating a communication system in accordance with an embodiment of the present invention.

As shown in FIG. 2, which presents a block diagram illustrating a communication system 200 in accordance with an embodiment of the present invention, frames, such as frame 100 (FIG. 1), are communicated between devices 210 in the communication system 200. Each of these devices may also communicate with a subset of the communication system 200. For example, a given device, such as device 210-4, may communicate with neighboring devices in a one-hop, two-hop, or three-hop neighborhood (i.e., these devices communicate via 0, 1, or 2 intermediary devices). Note that the given device may interfere with another device, such as device 210-3, if that device is within transmission range. Furthermore, devices 210 may compete with one another for access to a shared communication channel. Therefore, these devices may reserve time slots 110 (FIG. 1) using a channel-access protocol, such as a Medium-Access-Control protocol, and a given device may determine which, if any, of the available time slots 110 (FIG. 1) to reserve or to release based on the dynamic scheduling technique. Note that based on the reservations, only one device will transmit per time slot in a contending neighborhood, such as a two-hop neighborhood.

Figures 3, 4, 5:
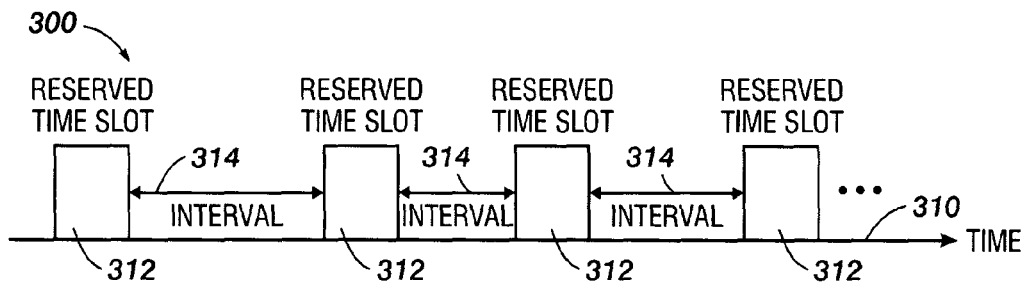
FIG. 3 is a block diagram illustrating reserved sub-channels in accordance with an embodiment of the present invention.
FIG. 4 is a block diagram illustrating election results in accordance with an embodiment of the present invention.
FIG. 5 is a block diagram illustrating permutation results in accordance with an embodiment of the present invention.

Unfortunately, existing dynamic scheduling techniques may lead to significant variations in a spacing or interval between reserved sub-channels for the given device. This is shown in FIG. 3, which presents a block diagram illustrating reserved sub-channels 312 as a function of time 310 in accordance with an embodiment 300 of the present invention. Note the variation in the length of time intervals 314. This variation may increase the channel-access delay for the given device. The dynamic scheduling technique described below address this problem using a heuristic approach that is performed by the devices 210 in FIG. 2 (i.e., which is distributed) based on limited network topology information as the network evolves (i.e., as devices are added, removed, and/or moved in the network).

Note that in some embodiments frame 100 (FIG. 1), communication system 200 (FIG. 2), and/or reserved sub-channels 312 include fewer or additional components, two or more components are combined into a single component, and/or a position of one or more components may be changed. For example, the number of frames per second that are communicated depends on timing and hardware. For example, a frame could be anywhere from 100 to 500 ms depending on how well the hardware keeps clocks synchronized between devices. Thus, the number of data packets 116 (FIG. 1) in frame 100 (FIG. 1) may vary in different implementations.

The basis of the dynamic scheduling technique is a conflict graph. Consider the network graph G=(V, E). For each device i ∈ V, let $$CS_i = \{i\} \cup \{j \in V | i \text{ contends with } j\},$$

where the set $CS_i$ is called the 'contention set' of device i. Note that the definition of "contends with" is dependent on the network technology. In some embodiments, the definition is that i and j are two-hop or three-hop neighbors. However, in other embodiments the definition is that the radio signal path-loss between i and j is small enough that these devices have a certain probability or greater of causing packet error if one transmits while the other receives from a third device.

As discussed previously, the dynamic scheduling technique uses a technique referred to as Pseudo-Random Election by Permutation (PREP) to assign sub-channels that the devices may use to transmit data. In an exemplary embodiment where the sub-channels are time slots, these elections are determined based on a set of time slots with inter-slot correlations. Furthermore, the elections may be performed in a distributed manner by the devices in the communication system. This technique can maximize channel usage while minimizing the variance in inter-time-slot scheduling times from the mean inter-time-slot scheduling time.

In PREP, a per-frame key $K(t_f)$ evolves over time and is used to generate permutations. In particular, PREP computes a permutation of time-slot numbers per device and elects the device for time slot $t_s$ with the highest (or lowest) ranking for $t_s$. For each frame number t, define K(t) to be a random number or a pseudo-random number called the frame key. Note that in some embodiments K(0) is a random number generated by a first device and K(t+1)=Hash(K(t)) is a progression by a hash chain. Furthermore, we assume that all devices are aware of the common time (i.e., are synchronized) and the common frame key K(t). Then, for each election cycle, every device i ∈ V computes a permutation vector $P_i(j, K(t))$ for each j ∈ $CS_i$. This permutation vector is a permutation of the time-slot array T specific to each contender j with key K(t). Note that this gives each contender a distinct ordering of T. Because each device uses the same set T as the set to permute, and because the permutation function is one-to-one, each device i computes the same vector for each j. Thus, the result $P_i(j, K)$ is independent of i.

A given device k wins the right to transmit in a given time slot s if the ranking of time slot s for device k is the unique minimum of all permutation vectors. Define rank(s, P) to be the ordering rank of time slot s in permutation vector P. Then, a possible outcome of an election at device A for contention set V={A, B}, E={(A, B)}, and T=(1, 2, 3, 4) is shown in FIG. 4, which presents a block diagram illustrating election results 400 in accordance with an embodiment of the present invention. In this example, the rank of time slot 1 for device A, rank(1, $P_A$(A, K)), is 4. Thus, time slot 1 appears in position 4 of $P_A$(A, K). Furthermore, rank(1, $P_A$(B, K))=2. Note that device i wins time slot s if rank(s, $P_i$(i, K))<rank(s, $P_i$(j, K)) for all other j ∈ $CS_i$. As a consequence, in this example device B wins time slot 1 because time slot 1 appears in $P_A$(B, K) before it appears in $P_A$(A, K).

It is possible that several devices may have equal rank for time slot s. In the preceding example, time slot 4 has equal rank for devices A and B. Define the equal rank set for s at device i, $ER_i$(s), as the set of devices in $CS_i$ that have equal and minimum rank for s:

$$ER_i(s) = \{j | j \in CS_i, \text{rank}(s, P_i(j, K)) = \min\{\text{rank}(s, P_i(m, K)) \forall m \in CS_i\}\}.$$

In this case, there are several ways to pick a single element k ∈ $ER_i$(s) to determine which device actually wins the time slot s: the least k is picked in normal sort order; k is picked where rank(s+1, P(k, K)) is maximum. (Note that this may be repeated in rounds if necessary. Furthermore, the addition s+1 is performed modulo |T|, thereby accounting for indices running from 1 ... M); and the selection may be the same as in the preceding item, but instead of using the rank(s+1, P(k, K)) value to break ties, a random number or pseudo-random number is generated for each device and time slot W[device][slot] and the device with the minimum (or maximum, or another ordering) W[n, s] value wins the time slot.

In the preceding example, using the second tie-breaking approach, device A wins time slots (3, 4) and B wins time slots (1, 2). Through simulation, we have found that the first tie-breaking approach is unfair when the number of devices is large compared to the number of time slots, such as when there are at least half as many devices as time slots. However, the second and third approaches are generally fair without significant difference.

A variety of permutation functions may be used in the dynamic scheduling technique. One random permutation generation technique assigns a random number or a pseudo-random number to each element of the vector T and then sorts T by the random elements. Note that if the same random number is assigned twice, a new random number is generated. Furthermore, duplicate random-number occurrences may be made small by using a random-number size that is much larger than the number of elements in T. To generate the function $P_t(j, K)$, one could seed the random-number generator or pseudo-random-number generator with seed j o K, where o is a deterministic one-to-one mapping such that no two distinct i, j ∈ V have the same mapping. In an exemplary embodiment, the seed for a current frame is a convolution of the given device identifier with a hashed value generated using the seed for the previous frame. In some embodiments, this seed is independent of times associated with sub-channels. For example, the seed may be independent of a convolution of a frame time and a time-slot time.

Table 1 provides exemplary pseudo-code for a random permutation technique (which is henceforth referred to as the "Knuth Shuffle" technique) in accordance with an embodiment of the present invention. The Knuth Shuffle is a technique of order O(M) that does not require tracking duplicates. It begins with the identity permutation (i.e., T in natural order) and iterates over positions 1 to M. Each position i is swapped with another randomly chosen element picked from locations i to |T|, inclusive. Function $P_t(j, K)$ may be computed similarly to the technique described previously, where the random-number generator or pseudo-random-number generator is seeded with j o K for each j.

TABLE 1

Knuth Shuffle(T)
note: input is vector T to be shuffled and output is a random permutation of T;
for i = 1 to |T| − 1;
   swap(T[i], T[random(i, |T| )] );
return T;

Note that there are many other ways to generate permutations. For example, cryptographic block ciphers and/or other pseudo-random functions that use deterministic shuffles based on a key j o K may be used rather than generating random numbers from a seed. Several embodiments of ways to generate the permutations are described below.

Table 2 provides exemplary pseudo-code for a dynamic scheduling technique (henceforth referred to as the "Run Election" technique) in accordance with an embodiment of the present invention. In this example, the schedule of winning device identifiers is determined given the set of random permutation vectors P[device][slot] and the set of device weights for tie-breaking. Note that these weights could be random numbers or they could be deterministic values based on device identifiers. Furthermore, if the weights are independent of the time of the time slot and have the same sort order as the device identifiers, one may remove the second clause in the 'if S[t]=N+1' operation and do away with the R and V vectors.

TABLE 2

Run Election(P[device][time slot], W[device][timeslot], N, M)
note: input random permutation matrix P[device][slot] and device weight W[device][slot] to break ties, the number of devices N and the number of time slots M;
note: output the winning schedule S[time slot] containing the device identifier for each time slot;
S[1, . . . , M]    note: S is the winning schedule, initialized to N + 1;
R[1, . . . , M]    note: the rank ordering of device-winning time slot;
V[1, . . . , M]    note: the weight of device winning slot;
for t = 1 to M;
  for n = 1 to N;
    if S[t] = N + 1 or (R[t] = t and W[n, t] < V [n, t]);
      S[t] = n;
      R[t] = t;
      V[t] = W[n, t];
return S;

We now discuss several embodiments of generating permutations of cycles. Generating a random permutation of the set $\{1, \ldots, n\}$ will induce a permutation $P_n$ consisting of cycles $\{C_1, \ldots, C_k\}$, where k=1 . . . n. Note that if k=1 then there is a single cycle of length $|C_1|=n$, and if k=n then there are n cycles all of length 1 (which is referred to as the identity permutation). Define a long cycle as a cycle with length $|C_{long}| \geq n/2$. Note that in a given permutation, there can be at most one long cycle. Furthermore, in a uniformly random permutation, such as one generated using the Knuth Shuffle technique, approximately 66% of the permutations contain a long cycle.

In the discussion that follows, we would like to generate random permutations with exactly one cycle of length n. This problem can be phrased in at least two ways. One could consider the complete graph $K_n$ and find a random Hamiltonian cycle. This would be a random permutation with one cycle of length n. Another phrasing of the problem would be to consider a given permutation with cycle of length n and then randomly permute that cycle. For example, one could begin with the shift-right permutation $\pi(x)=x+1$ mod n, and then randomize. Note that if one expresses the permutation $\pi(x)$ as a digraph then the problem is to generate an random automorphism group that preserves the edge set of a directed ring on the integers $\{1, \ldots, n\}$.

In the Hamiltonian method, an arbitrary staring device is picked and a path through each vertex is walked once. Then, the last device is connected with the first device. This is called a cycle graph. Note that there will be n! such cycles, but only (n−1)! of them are not simple rotations of one another, and thus equivalent. Table 3 provides exemplary pseudo-code for a Hamiltonian-cycle permutation technique in accordance with an embodiment of the present invention (henceforth referred to as the "Hamiltonian Cycle" technique). This example begins with the arbitrary device 1 and then walks a random arrangement of the remaining devices. At each iteration, a directed edge (u, v) is added to the edge set, and at the end of the iteration, the cycle is closed by adding edge (v, 1). Furthermore, note that in the second operation there are (n−1)! orderings.

TABLE 3

Hamiltonian Cycle(n)
note: input the number of devices n and output the directed edge set E defining the mapping
   π (x) as (x, π (x));
E = ϕ;
A = shuffle({2, . . . , n});
u = 1;
for i = 1 to |A|;
   v = A[i];
   E = E ∪ (u, v);
   u = v;
   E = E ∪ (u, 1);
return E;

Another permutation technique is known as the automorphism method. From the Hamiltonian technique, we can make several observations. To generate a complete cycle graph, we can begin with a canonical directed edge set $\{(1, 2), (2, 3), \ldots, (i, i+1), \ldots, (n-1, n)\}$ and change the device labels. This creates an automorphism of the directed ring, and leads to the second observation. If one writes, instead of the edge set, the device visitation order $(1, 2, \ldots, n)$, which is equivalent to the identity-permutation mapping, and then generate a random permutation of this device set, one has a random n-cycle. Note that one may use the Knuth Shuffle technique for this permutation.

This automorphism on the ordered set $(1, \ldots, n)$ is different than the permutation on T described previously. In particular, while they are both Knuth Shuffles of the same set T, the elements have a different interpretation. Consider the set K=Knuth Shuffle(T). In the previous discussion, the permutation $\pi_t(i)$ was defined as $$\pi_t(i)=k[i].$$

This is similar to the interpretation of representing the permutation as a 'two-line' representation, i.e., $$\begin{pmatrix} 1 & 2 & \ldots & n \\ \pi(1) & \pi(2) & \ldots & \pi(n) \end{pmatrix}.$$

Furthermore, this interpretation allows any permissible cycles in the random permutation. Therefore, the automorphism method of generating an n-cycle is to interpret T and K in cycle notation, where the set defines the visitation order of devices around a directed ring. Using this interpretation, the permutation $\pi_c(i)$ is defined as $$\pi_c(i)=K[(\text{rank}(i)+1 \bmod n)+1].$$

Note that the final '+1' is due to indexing the array from $1 \ldots n$ rather than $0 \ldots (n-1)$.

For example, if we have K=(2, 1, 3, 5, 4), the interpretations of $\pi_t$ and $\pi_c$ are very different. Mappings of $\pi_t(i)$ are shown in FIG. 5, which presents a block diagram illustrating permutation results 500 in accordance with an embodiment of the present invention. In this example, K is interpreted as a two-line matrix, while $\pi_c(i)$ interprets it as cycle notation. Notice that $\pi_t(i)$ may be written in cycle notation as (1 2), (4 5). Also note that it contains two 2-cycles and one 1-cycle. Furthermore, the image of $\pi_c(i)$ is a single n-cycle.

Another permutation technique is known as the "Latin Squares" technique. A Latin Square is an M×M matrix where each column is a permutation of $(1, \ldots, M)$ and no row contains the same element more than once. One way to generate a Latin Square is to begin with the identity permutation and then rotate the row one symbol per column. Note that other row permutations per column will also result in a Latin Square.

In terms of scheduling, if one generates the set of Latin Square columns, or the set of extended Mutually Orthogonal Latin Square columns, and chooses one column per device, one achieves a set of permutation vectors per device. Furthermore, if one could assure picking distinct columns per device then one would have non-conflicting schedules that guarantee each device wins at least one time slot per frame, this being the time slot listed in row 1 of each permutation.

Note that the Latin Square technique (or any limited rotation method) suffers from the Birthday Paradox if devices randomly pick scheduling columns. If there are N devices and M time slots, the probability that no two devices conflict is equal to the probability that each device picks a distinct column from the Latin Square. This is the same as N people having birthdays over M days. For the case of 50 devices and 500 time slots, the probability that at least two pick the same row is 91.4%. Moreover, with 500 time slots, to limit the probability of two devices picking the same column to under 50%, we could have at most 26 devices. Therefore, this approach may be limited when considering a large number of devices relative to the number of time slots.

Rank ordering in PREP may enable new degrees of freedom in the communication system. One possibility is the use of virtual frame sizes. Typically, changing the frame size is difficult, because each physical frame corresponds to a timing interval and has an associated frame key K, and because a specific channel-access-protocol layer may also associate other signaling with physical frames. However, with PREP devices may logically partition the M times slots in to any number of groups, where $m1+ \ldots +m_p=M$ and each $m_i$ is the number of time slots in the i-th partition. Note that within each partition i, a device constructs a random $m_i$-cycle of the time slots. For example, if there are 10 time slots, we may construct a (3, 3, 4) partition and each device would pick a permutation isomorphic to the cycles (1 2 3) (4 5 6) (7 8 9 10).

In practice, a frame may include 250-500 time slots to accommodate large device densities. However, this can lead to large variances in inter-slot time intervals. Furthermore, if devices dynamically adjust a virtual frame size closer to the number of competing devices, the variance in inter-slot time will be reduced. Because it may be undesirable for different devices in an area to have different virtual frames sizes, one may adopt a virtual frame-size convention, such as using frame sizes that are powers of 2. This indicates that each virtual-frame-size scheduling cycle is a sub-cycle of larger virtual frame sizes. It also reduces the signaling and device state space to a few cycle sizes, such as 16, 32, 64, 128, 256, and 512.

In an exemplary embodiment, cycles are chosen as a partition of the total time slots and each partition is independently randomized to create virtual frame in each partition. For example, a first ordered set of sub-channel identifiers in a first device may corresponds to a first sub-set of the sub-channels in a current frame. Furthermore, another device may be configured to determine a second set of sub-channels to reserve based on a second election technique in which a second ranking of a second permutation of a second ordered set of sub-channel identifiers is determined. Note that the second ordered set of sub-channel identifiers may correspond to a second sub-set of the sub-channels in the current frame. Therefore, in some embodiments different devices may determine sub-channel reservations using independent sub-frames. This approach may improve fairness in sub-channel scheduling.

The PREP dynamic scheduling technique was analyzed using numerical simulations for characteristics, such as per-slot fairness. When considering fairness, one often assumes fairness indicates that all devices, over time, have an equal access to the channel assuming equal priority. PREP exhibits this long-term fairness. However, another important aspect of channel access is the variation from the mean channel-access rate. If two protocols A and B have the same mean channel-access rates, it does not imply that all devices have the same performance. It could be that in protocol A every one of four devices accesses the channel in exactly four time slots, i.e., this protocol is perfectly fair. However, in protocol B it could be that two devices access the channel every 3 time slots and the other two devices access the channel every five time slots. Thus, in this example the two protocols have the same mean channel-access rate, but protocol B has larger variance in the per-device inter-time-slot time interval. As we show below, PREP has a small inter-time-slot time interval variance.

Consider N devices in a fully connected network. If a device has probability p=1/N of winning a time slot then the time interval between time slots for a given device is geometric with mean N and variance $(1-p)/p^2$. FIG. 6 presents a block diagram illustrating standard deviation in the time-slot interval as a function of the number of devices 610 in accordance with an embodiment 600 of the present invention. Geometric 612 is the standard deviation of the geometric series for N devices, and N/N 614 is the PREP-election scheme with the number of time slots equal to the number of devices. Furthermore, N/2N 616 is the PREP-election scheme where the number of time slots is 2N, and N/10N 618 is the PREP-election scheme where the number of time slots is 10N.

Due to computation time, election results were computed over 1000 frames (for 20 and 100 devices) or 500 frames (for 250 and 500 devices). In addition, the results use a random tie-breaker scheme. Note that the results show that when the device/time-slot ratio is low (such as in N/10N 618) a random-permutation scheme behaves slightly better than a random geometric distribution. In particular, it has smaller standard deviations, so devices do not have as large a variation in service intervals. However, at higher loads, such as with N/N 614 and N/2N 616, there is a significant difference. In particular, the PREP-election scheme has a much smaller standard deviation in inter-slot time interval. Thus, PREP has the desirable characteristic that as the load increases, the standard deviation decreases.

If we use the virtual-frame-size feature of PREP, with the virtual frame size set to the number of contending devices, then we may further reduce the variance in the inter-time-slot time interval. This is shown in FIG. 7, which presents a block diagram of illustrating standard deviation in the time-slot interval as a function of the number of devices 610 in accordance with an embodiment 700 of the present invention. Note that the results for N/N 614 are slightly different than in embodiment 600 (FIG. 6) because the virtual-frame-size numerical simulations were performed using different random-number seeds.

Another important characteristic of an election scheme is the maximum time to service. FIG. 8 presents a block diagram illustrating $99^{th}$-percentile inter-time-slot time intervals in accordance with an embodiment 800 of the present invention. Note that the $99^{th}$-percentile inter-time-slot time intervals are representative of the maximum delay a device may have between service intervals. Furthermore, in this example we see that when 20 devices contend for time slots with a 1/20 chance of winning, the $99^{th}$-percentile delay is 90 time slots for a geometric distribution. Because the $99^{th}$ percentile is strongly correlated with the standard deviation, it is no surprise that the PREP elections have better $99^{th}$-percentile results. As with the standard deviations, the PREP elections have better performance with higher contention. But even for N/10N 618, the PREP elections are 23-25% better than a purely random distribution.

FIG. 9 presents a block diagram illustrating $99^{th}$-percentile inter-time-slot time intervals in accordance with a virtual-frame-size embodiment 900 of the present invention. In this example, we see that the tail of the delay distribution becomes insensitive to the number of contending devices relative to the number of available time slots.

Note that the PERP-dynamic-scheduling technique is better than a purely random election because there is a negative correlation between winning one time slot and winning a second time slot within a frame. Furthermore, the election is performed as a permutation of the sequence (1, ..., M), with victory determined by a rank order for a time slot. Thus, if a device wins one time slot (say time slot 50) that was moved up in rank order (for example to 10), that implies that some other time slot (such as 10) was move down in rank order (for example, to rank 50).

Figure 10:
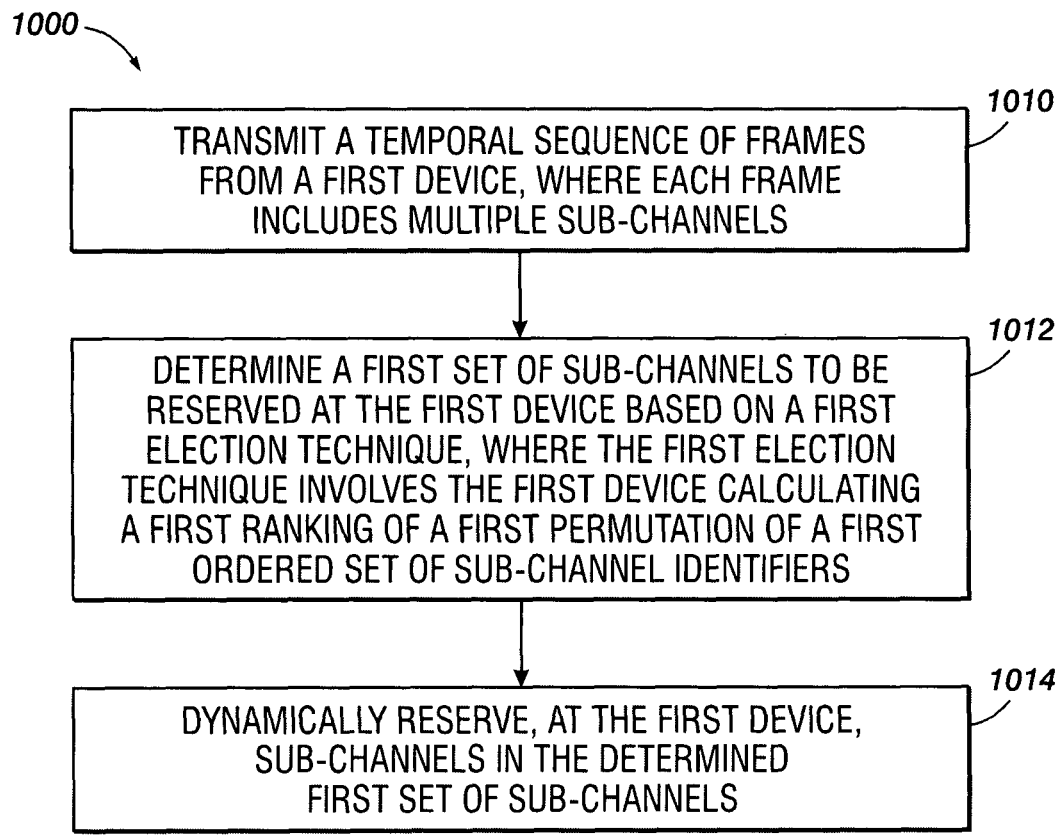
FIG. 10 is a flow chart illustrating a process for communicating between devices in accordance with an embodiment of the present invention.

We now discuss embodiments of a process for communicating between devices. FIG. 10 presents a flow chart illustrating a process 1000 for communicating between devices in accordance with an embodiment of the present invention. During this process, a first device transmits a temporal sequence of frames, where each frame includes multiple sub-channels (1010). Next, the first device determines a first set of sub-channels to be reserved based on a first election technique (1012). Note that the first election technique involves the first device calculating a first ranking of a first permutation of a first ordered set of sub-channel identifiers. Then, the first device dynamically reserves sub-channels in the determined first set of sub-channels (1014). Note that in some embodiments there may be additional or fewer operations, the order of the operations may be changed, and two or more operations may be combined into a single operation.

Figure 11:
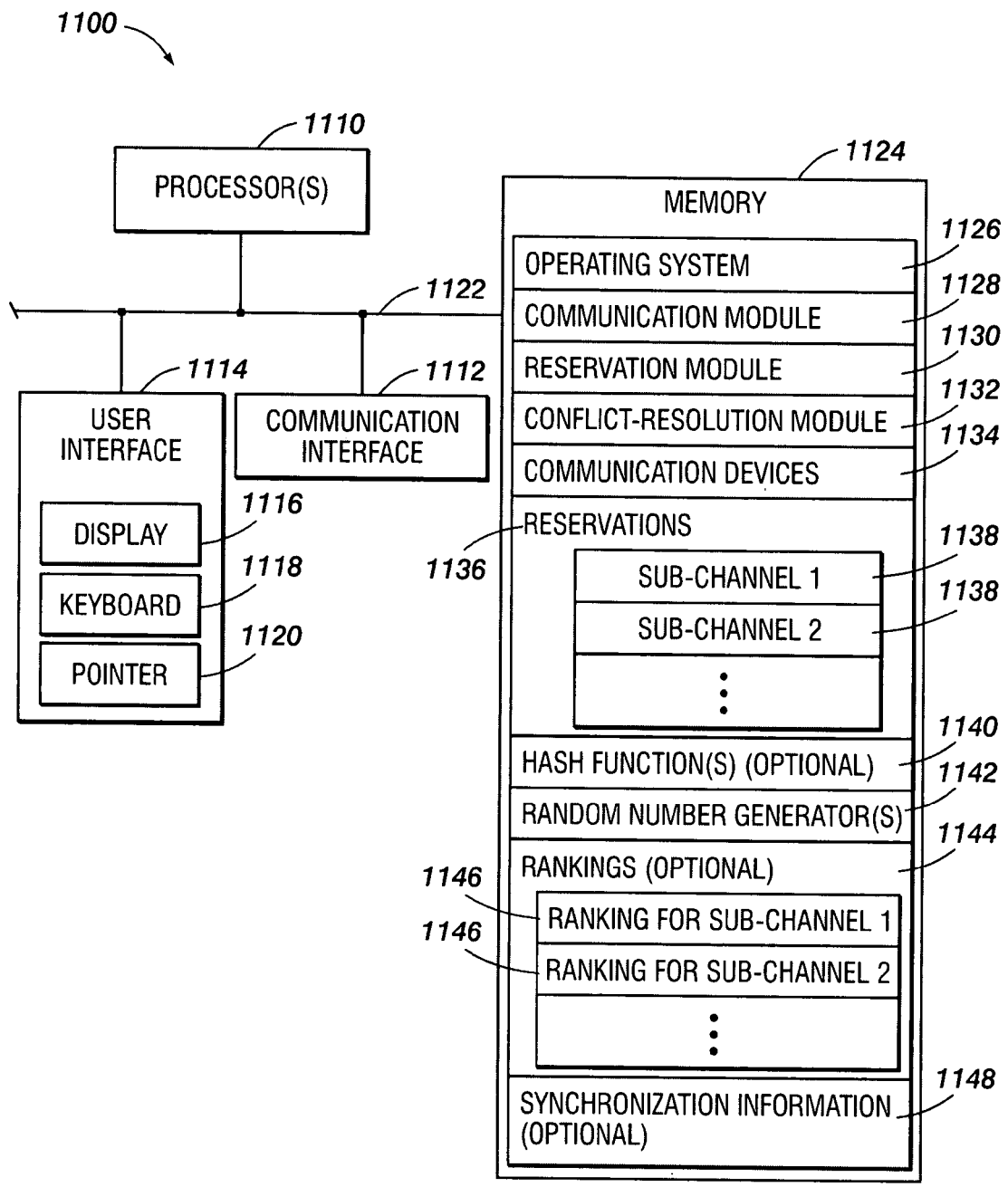
FIG. 11 is a block diagram illustrating a device in accordance with an embodiment of the present invention.

We now described devices for use in communication systems. FIG. 11 is a block diagram illustrating a device 1100 in accordance with an embodiment of the present invention. Device 1100 includes one or more processors 1110, a communication interface 1112, a user interface 1114, and one or more signal lines 1122 coupling these components together. Note that the one or more processing units 1110 may support parallel processing and/or multi-threaded operation, the communication interface 1112 may have a persistent communication connection, and the one or more signal lines 1122 may constitute a communication bus. Moreover, the user interface 1114 may include a display 1116, a keyboard 1118, and/or a pointer 1120, such as a mouse.

Memory 1124 in the device 1100 may include volatile memory and/or non-volatile memory. More specifically, memory 1124 may include ROM, RAM, EPROM, EEPROM, FLASH, one or more smart cards, one or more magnetic disc storage devices, and/or one or more optical storage devices. Memory 1124 may store an operating system 1126 that includes procedures (or a set of instructions) for handling various basic system services for performing hardware dependent tasks. In some embodiments, the operating system 1126 is a real-time operating system. The memory 1124 may also store procedures (or a set of instructions) in a communication module 1128. The communication procedures may be used for communicating with one or more computers, devices and/or servers, including computers, devices and/or servers that are remotely located with respect to the device 1100.

Memory 1124 may also include multiple program modules (or a set of instructions), including reservation module 1130 (or a set of instructions) and conflict-resolution module 1132 (or a set of instructions). Furthermore, memory 1124 may include a list of communication devices 1134 (including device identifiers) that are communicating with the device 1100, and/or reservations 1136 for sub-channels 1138. In addition, memory 1124 may include one or more optional hash functions 1140, one or more random-number generators (or pseudo-random-number generators) 1142, optional rankings 1144, and/or optional synchronization information 1148. Note that optional rankings 1144 may include rankings for sub-channels 1146.

Instructions in the various modules in memory 1124 may be implemented in a high-level procedural language, an object-oriented programming language, and/or in an assembly or machine language. The programming language may be compiled or interpreted, i.e, configurable or configured to be executed by the one or more processing units 1110.

Although device 1100 is illustrated as having a number of discrete items, FIG. 11 is intended to be a functional description of the various features that may be present in device 1100 rather than as a structural schematic of the embodiments described herein. In practice, and as recognized by those of ordinary skill in the art, the functions of the device 1100 may be distributed over a large number of servers or computers, with various groups of the servers or computers performing particular subsets of the functions. In some embodiments, some or all of the functionality of device 1100 may be implemented in one or more ASICs and/or one or more digital signal processors DSPs.

Device 1100 may include fewer components or additional components, two or more components may be combined into a single component, and/or a position of one or more components may be changed. In some embodiments the functionality of device 1100 may be implemented more in hardware and less in software, or less in hardware and more in software, as is known in the art.

Figure 12:
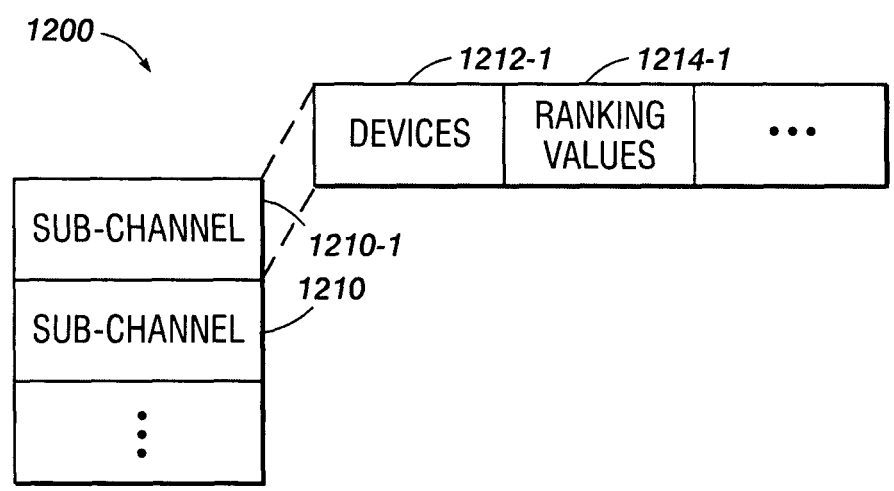
FIG. 12 is a block diagram illustrating a data structure in accordance with an embodiment of the present invention.

We now discuss data structures that may be used in device 1100. FIG. 12 is a block diagram illustrating a data structure 1200 in accordance with an embodiment of the present invention. This data structure may include rankings for sub-channels 1210. Each of these rankings may include devices 1212-1 and ranking values 1214-1. Note that that in some embodiments of the data structure 1200 there may be fewer or additional components, two or more components may be combined into a single component, and/or a position of one or more components is changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A communication system, comprising:
   devices configured to communicate with each other through a temporal sequence of frames, wherein each frame includes sub-channels identified by sub-channel identifiers which form an ordered set, and wherein the sub-channels in a frame are grouped into multiple logical partitions corresponding to multiple virtual frames;
   wherein a first device computes a ranked permutation vector of sub-channel identifiers in the ordered set for each of the devices;
   wherein the first device selects a first set of sub-channels to be reserved by the first device, which involves selecting a sub-channel whose ranking in the first device's ranked permutation vector is higher than in the ranked permutation vectors for each of the other devices; and
   wherein the first device reserves the sub-channel in the determined first set of sub-channels.

2. The communication system of claim 1, wherein the permutation is pseudo-random.

3. The communication system of claim 1, wherein the permutation is performed on a frame-by-frame basis.

4. The communication system of claim 1, wherein the permutation for a current frame is based on a pseudo-random number associated with a preceding frame.

5. The communication system of claim 4, wherein a pseudo-random-number generator generates the pseudo-random number, and wherein the pseudo-random-number generator uses a seed corresponding to an identifier for the preceding frame.

6. The communication system of claim 5, wherein the seed is determined using a hash function.

7. The communication system of claim 1, wherein the first set of sub-channels to be reserved by the first device has an inter-sub-channel spacing that is less than a pre-determined value.

8. The communication system of claim 1, wherein the first set of sub-channels to be reserved is determined independently of times associated with the first set of sub-channels.

9. The communication system of claim 1, wherein if a tie occurs in which a group of devices are awarded equal priority for a given sub-channel in the first set of sub-channels in the election technique, the tie is resolved using a pseudo-random number.

10. The communication system of claim 1, wherein if a tie occurs in which a group of devices are awarded equal priority for a given sub-channel in the first set of sub-channels in the election technique, the tie is resolved by awarding the given sub-channel to a first device in the group of devices that has been awarded the fewest sub-channels in a current frame using the election technique.

11. The communication system of claim 1, wherein the ordered set of sub-channel identifiers corresponds to a first sub-set of the sub-channels in a current frame.

12. The communication system of claim 11, wherein another device in the devices is configured to determine a second set of sub-channels to be reserved by calculating and ranking a permutation of sub-channel identifiers in an ordered set corresponding to a second sub-set of the sub-channels in the current frame.

13. The communication system of claim 1, wherein the number of devices which are contending for sub-channels using the election technique is larger than the number of sub-channels in each frame.

14. The communication system of claim 1, wherein each device contending for sub-channels using the election technique receives at least one sub-channel in a current frame.

15. The communication system of claim 1, wherein the sub-channels correspond to time slots.

16. The communication system of claim 1, wherein the sub-channels correspond to frequency bands.

17. The communication system of claim 1, wherein the sub-channels correspond to spread-spectrum codes.

18. The communication system of claim 1, wherein the sub-channels correspond to directional antennas that transmit and receive the frames.

19. A communication device, comprising:
   a transceiver configured to communicate with other devices through a temporal sequence of frames,
   wherein each frame includes sub-channels that are identified by sub-channel identifiers which form an ordered set, and wherein the sub-channels in a frame are grouped into multiple logical partitions corresponding to multiple virtual frames;
   wherein the communication device computes a ranked permutation vector of sub-channel identifiers in the ordered set for each of the other devices;
   wherein the communication device selects a first set of sub-channels to be reserved by the communication device, which involves selecting a sub-channel whose ranking in the communication device's ranked permutation vector is higher than in the ranked permutation vectors for each of the other devices; and
   wherein the communication device reserves the sub-channel in the determined first set of sub-channels.

20. A method for communicating between devices, comprising:
   transmitting a temporal sequence of frames from a first device, wherein each frame includes sub-channels that are identified by sub-channel identifiers which form an ordered set, and wherein the sub-channels in a frame are grouped into multiple logical partitions corresponding to multiple virtual frames;
   computing, by the first device, a ranked permutation vector of sub-channel identifiers in the ordered set for each of the devices;

selecting a first set of sub-channels to be reserved by the first device, which involves selecting a sub-channel whose ranking in the first device's ranked permutation vector is higher than in the ranked permutation vectors for each of the other devices; and reserving, by the first device, the sub-channel in the determined first set of sub-channels.

\* \* \* \* \*